(12) United States Patent
Yamada

(10) Patent No.: US 11,393,104 B2
(45) Date of Patent: Jul. 19, 2022

(54) DISTANCE MEASURING DEVICE

(71) Applicant: DMG MORI Co., Ltd., Yamatokoriyama (JP)

(72) Inventor: Tomoaki Yamada, Yamatokoriyama (JP)

(73) Assignee: DMG MORI Co., Ltd., Yamatokoriyama (JP)

( * ) Notice: Subject to any disclaimer, the term of this patent is extended or adjusted under 35 U.S.C. 154(b) by 0 days.

(21) Appl. No.: 17/258,804

(22) PCT Filed: Apr. 24, 2019

(86) PCT No.: PCT/JP2019/017338
§ 371 (c)(1),
(2) Date: Jan. 8, 2021

(87) PCT Pub. No.: WO2020/012757
PCT Pub. Date: Jan. 16, 2020

(65) Prior Publication Data
US 2021/0225010 A1    Jul. 22, 2021

(30) Foreign Application Priority Data

Jul. 13, 2018  (JP) .............................. JP2018-133488

(51) Int. Cl.
*G06T 7/246* (2017.01)
*G06T 7/73* (2017.01)
(Continued)

(52) U.S. Cl.
CPC ............ *G06T 7/246* (2017.01); *G06T 1/0014* (2013.01); *G06T 7/60* (2013.01); *G06T 7/73* (2017.01); *G06T 2207/30244* (2013.01)

(58) Field of Classification Search
None
See application file for complete search history.

(56) References Cited

U.S. PATENT DOCUMENTS

| 10,924,670 B2 * | 2/2021 | Liu ...................... H04N 13/246 |
| 2003/0194111 A1 * | 10/2003 | Kano ................... H04N 1/1013 |
| | | 358/3.26 |

(Continued)

FOREIGN PATENT DOCUMENTS

| CN | 202158851 U | 3/2012 |
| CN | 103017730 A | 4/2013 |

(Continued)

*Primary Examiner* — Tyler W. Sullivan
(74) *Attorney, Agent, or Firm* — The Webb Law Firm

(57) ABSTRACT

Provided is a machine tool including: an image acquiring unit that acquires an image of an imaging target; a movement mechanism that relatively moves the imaging target and the image acquiring unit; and a control unit, wherein the movement mechanism relatively moves the imaging target and the image acquiring unit by a known distance in an imaging direction of the image acquiring unit or in a direction substantially perpendicular to the imaging direction, and the image acquiring unit acquires images of the imaging target before and after the movement, and the control unit calculates a distance between the image acquiring unit and the imaging target in the imaging direction based on a movement distance or a length measured in the two acquired images. This enables distance measurement to be performed in a short time without making contact with an object to be measured.

1 Claim, 3 Drawing Sheets

(51) Int. Cl.
*G06T 1/00* (2006.01)
*G06T 7/60* (2017.01)

(56) References Cited

U.S. PATENT DOCUMENTS

| | | | | |
|---|---|---|---|---|
| 2006/0251410 | A1* | 11/2006 | Trutna | H04N 5/23258 |
| | | | | 348/E5.046 |
| 2007/0087630 | A1* | 4/2007 | Ku | H05K 3/0097 |
| | | | | 439/607.01 |
| 2008/0024649 | A1* | 1/2008 | Okawara | G03B 13/14 |
| | | | | 348/347 |
| 2011/0169957 | A1* | 7/2011 | Bartz | G06T 1/0007 |
| | | | | 348/149 |
| 2013/0114861 | A1 | 5/2013 | Takizawa | |
| 2014/0253738 | A1* | 9/2014 | Mullis | H04N 13/246 |
| | | | | 348/187 |
| 2015/0062326 | A1* | 3/2015 | Startchik | G01N 21/84 |
| | | | | 348/86 |
| 2015/0310619 | A1 | 10/2015 | Cao | |
| 2015/0317783 | A1* | 11/2015 | Srocka | G06T 7/30 |
| | | | | 382/149 |
| 2016/0029000 | A1* | 1/2016 | Lenz | H04N 9/04557 |
| | | | | 348/239 |
| 2017/0111558 | A1* | 4/2017 | Brueckner | H04N 17/002 |
| 2017/0132784 | A1* | 5/2017 | Yamada | G06K 9/6201 |
| 2018/0274915 | A1 | 9/2018 | Tsurumi et al. | |
| 2019/0234725 | A1* | 8/2019 | Klimov | G01B 11/002 |
| 2021/0090269 | A1* | 3/2021 | Troy | G01S 15/8945 |

FOREIGN PATENT DOCUMENTS

| | | |
|---|---|---|
| CN | 103085076 A | 5/2013 |
| CN | 108139211 A | 6/2018 |
| DE | 102014212225 A | 12/2014 |
| GB | 2515657 A | 12/2014 |
| JP | H08254424 A | 10/1996 |
| JP | 2001012944 A | 1/2001 |
| JP | 2012213840 A | 11/2012 |
| JP | 2015006721 A | 1/2015 |
| JP | 20173389 A | 1/2017 |
| JP | 2017173032 A | 9/2017 |

* cited by examiner

DISTANCE MEASURING DEVICE

CROSS-REFERENCE TO RELATED APPLICATIONS

This application is the United States national phase of International Application No. PCT/JP2019/017338 filed Apr. 24, 2019, and claims priority to Japanese Patent Application No. 2018-133488 filed Jul. 13, 2018, the disclosures of which are hereby incorporated by reference in their entirety.

BACKGROUND OF THE INVENTION

Field of the Invention

The present invention relates to a measurement device for measuring the distance to an object.

Description of Related Art

In machine tools, contact-type probes for measuring a distance by making contact with an object to be measured are widely used. However, it is difficult for the contact-type probes to measure the distance to an object that is difficult to make contact with, such as chips having high temperature and covered with oil. Thus, there has been proposed a machine tool capable of performing non-contact distance measurement by using an image captured by an imaging device (see Patent Literature 1, for example).

CITATION LIST

Patent Literature

Patent Literature 1: JP 2012-213840 A

SUMMARY OF THE INVENTION

Technical Problem

In the machine tool disclosed in Patent Literature 1, images of two members for which to perform distance measurement are simultaneously captured by the imaging device, image Processing is performed on the simultaneously captured images, and the distance between the two members is calculated. However, since it takes a lot of calculation time to obtain the distance by image processing, it is difficult to measure the distance without taking idle time during the process from the preparation to the end of the machining of the machine tool.

The present invention has been made in view of the above problem, and an object thereof is to provide a measurement device capable of performing distance measurement in a short time without making contact with an object to be measured.

Solution to Problem

In order to solve the above problem, a measurement device according to one aspect of the present invention includes:

an image acquiring unit that acquires an image of an imaging target;

a movement mechanism that relatively moves the imaging target and the image acquiring unit; and a control unit, wherein the movement mechanism relatively moves the imaging target and the image acquiring unit by a known distance in an imaging direction of the image acquiring unit or in a direction substantially perpendicular to the imaging direction, and the image acquiring unit acquires images of the imaging target before and after the movement, and the control unit calculates a distance between the image acquiring unit and the imaging target in the imaging direction based on a movement distance or a length measured in the two acquired images.

According to the above aspect, it is possible to provide a measurement device capable of performing distance measurement in a short time without making contact with an object to be measured.

DESCRIPTION OF THE INVENTION

Figure 1:
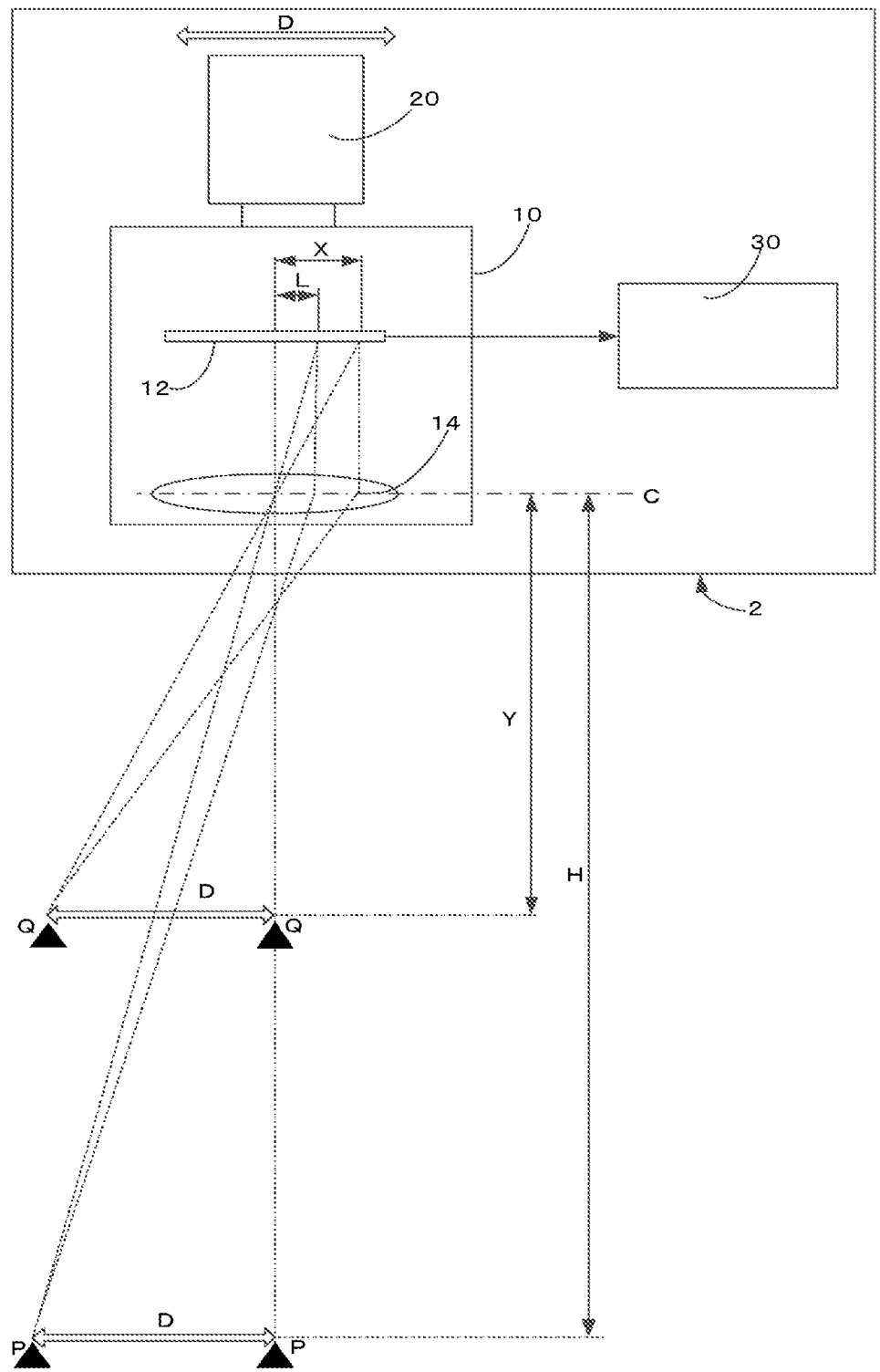
FIG. 1 is a schematic diagram showing an outline of a measurement device and a measurement method according to one embodiment of the present invention.

Embodiments for carrying out the present invention will be described below with reference to the drawings. The embodiments described below are for embodying the technical idea of the present invention, and the present invention is not limited to the following unless otherwise specified. The sizes, positional relationships and the like of members shown in the drawings may be exaggerated for clarity of description.

(Measurement Device According to One Embodiment of the Present Invention)

First, a measurement device according to one embodiment of the present invention will be described with reference to FIG. 1. FIG. 1 is a schematic diagram showing an outline of a measurement device and a measurement method according to one embodiment of the present invention.

A measurement device 2 according to the present embodiment includes an image acquiring unit 10 that acquires an image of an imaging target, a movement mechanism or actuator 20 that relatively moves the imaging target and the image acquiring unit 10, and a control unit or processor 30.

The image acquiring unit 10 includes an imaging element 12 and an optical system 14. The imaging element 12 is positioned at the focal position of the optical system 14. In this manner, an image formed by the optical system 14 is acquired by the imaging element 12 as electronic data and is transmitted to the control unit 30. Any imaging element such as a CCD image sensor or a CMOS image sensor can be used as the imaging element 12.

In the present embodiment, the image acquiring unit 10 is attached to a main spindle of a machine tool. Therefore, a movement device of the main spindle that moves the image acquiring unit 10 is the movement mechanism 20, which relatively moves the imaging target and the image acquiring unit 10. However, there is no limitation thereto, and it is possible that the imaging target is placed on a work table and a movement device of the work table that moves the imaging target is the movement mechanism 20, which relatively moves the imaging target and the image acquiring unit 10. Also, both of the imaging target and the image acquiring unit 10 may be moved by the movement mechanism.

Further, the measurement device 2 may include its own movement mechanism, instead of the movement mechanism of the machine tool.

Regarding the control unit 30, the measurement device 2 may include its own control device, or a control device of the machine tool may be used to implement the function of the control unit.

As described above, the measurement device 2 according to the present embodiment may be configured as an independent device including the image acquiring unit 10, the movement mechanism 20, and the control unit 30, or may be a device that is partially incorporated in the machine tool and uses the movement machine mechanism and the control device of the machine tool. In the latter case, it can be referred to as a machine tool provided with the measurement device 2.

<Distance Measurement Method>

In the example shown in FIG. 1, a point P vertically separated from the image acquiring unit 10 by a distance H and a point Q vertically separated from the image acquiring unit 10 by a distance Y are imaging targets. Specifically, the distance between the image acquiring unit 10 and the imaging targets (points) P and Q refers to the vertical distance between a position C at the vertical center of the optical system 14 of the image acquiring unit 10 and the imaging targets (points) P and Q.

Although actually the image acquiring unit 10 is horizontally moved by a distance D by the movement mechanism 20 and images of the imaging targets (points) P and Q before and after the movement are captured from the vertical direction, FIG. 1 is shown as if the image acquiring unit 10 is fixed and the imaging targets (points) P and Q are relatively moved.

First, reference data is acquired in order to enable distance measurement by the measurement device 2. Specifically, images are acquired before and after horizontally moving the imaging target (point) P by a known distance D while the image acquiring unit 10 and the imaging target (point) P are separated by a known distance H. By comparing the images before and after the movement, it is possible to acquire a distance L of the formed images on the imaging element 12 corresponding to the known distance D when the image acquiring unit 10 and the imaging target (point) P are separated by the known distance H. The control unit 30 stores the known distance D, the known distance H, and the corresponding distance L of the formed images on the imaging element 12. This is used as reference data for measuring an unknown distance Y between the image acquiring unit 10 and the imaging target Q.

In the actual measurement, images are acquired before and after horizontally moving the imaging target (point) Q by the known distance D while the image acquiring unit 10 and the imaging target Q are separated by the unknown distance Y. By comparing the images before and after the movement, it is possible to acquire a distance X of the formed images on the imaging element 12 corresponding to the known distance D when the image acquiring unit 10 and the imaging target (point) Q are separated by the unknown distance Y.

As is apparent from FIG. 1, the relationship between the distance L of the formed images on the imaging element 12 corresponding to the distance D with the separation by the distance H and the distance X of the formed images on the imaging element 12 corresponding to the distance D with the separation by the unknown distance Y is expressed in the following equation.

$$Y/H = L/X \qquad \text{(Equation 1)}$$

For example, if the vertical distance H is twice the distance Y, the distance X of the formed images of the nearer one is twice the length L of the formed images of the farther one. For example, if the distance of the formed images corresponding to the distance D at the separation distance H is ½ pixel (e.g., 200 μm), the formed images corresponding to the distance D at the separation distance Y are 1 pixel (e.g., 400 μm).

Therefore, if the distance L of the formed images corresponding to the known distance D when the image acquiring unit 10 and the imaging target (point) P are separated by the known distance H is once acquired and stored in the control unit 30, by acquiring the distance X of the formed images corresponding to the known distance D, the unknown distance Y between the image acquiring unit 10 and the imaging target (point) Q can be calculated by a very simple calculation as below.

$$Y = (H \times L)/X \qquad \text{(Equation 2)}$$

<Actual Distance Measurement>

Next, actual distance measurement using the above-described measurement device 2 in the machine tool will be described.

[First Distance Measurement Method]

Figure 2:
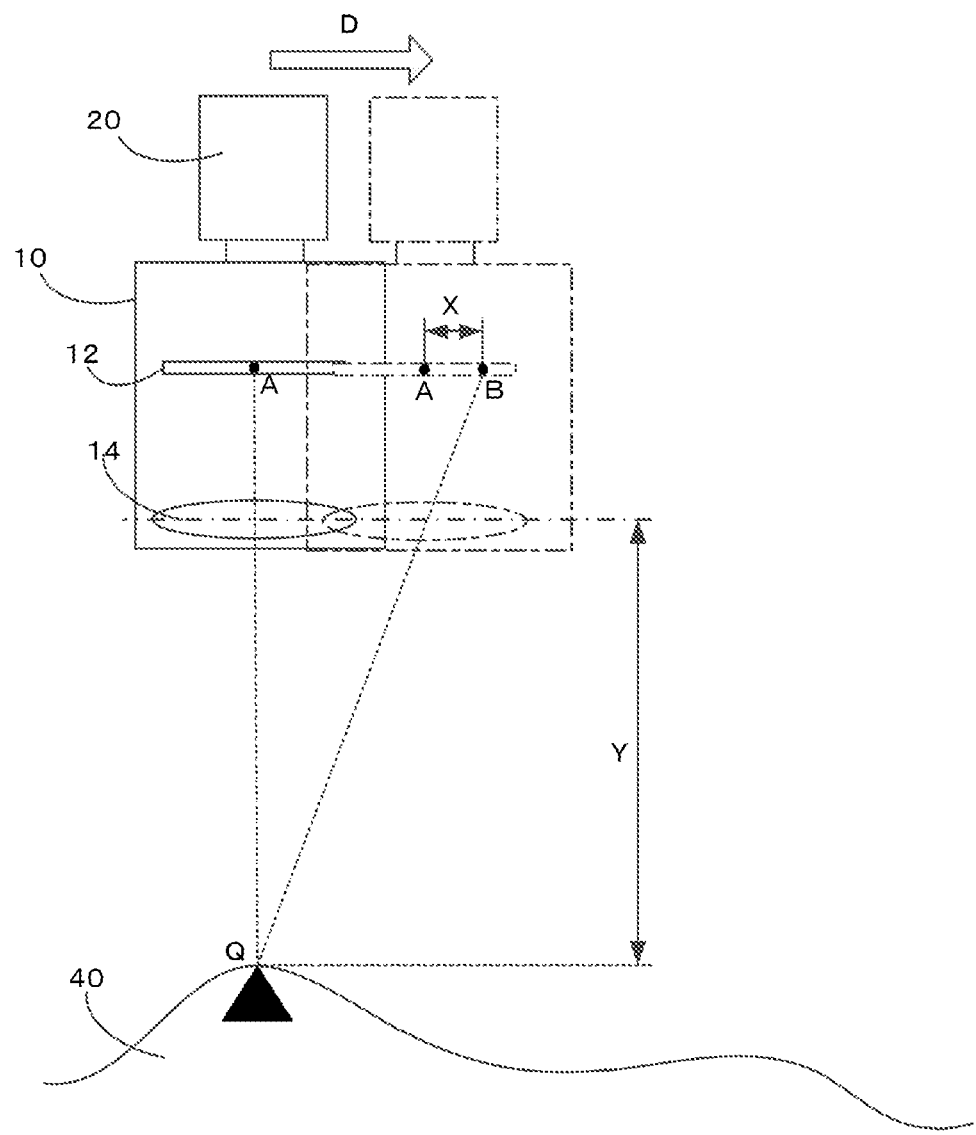
FIG. 2 is a diagram schematically showing a first distance measurement method in which distance measurement is performed by using the measurement device shown in FIG. 1.

First, a first distance measurement method in which actual distance measurement is performed by using the above-described measurement device 2 will be described with reference to FIG. 2. FIG. 2 is a diagram schematically showing the first distance measurement method in which distance measurement is performed by using the measurement device 2 shown in FIG. 1.

When moving the main spindle or the like of the machine tool, it is necessary to move it without touching chips irregularly accumulated during the machining. The example shown in FIG. 2 shows a case where the image acquiring unit 10 acquires images of the imaging target (point) Q located at the upper end of a pile of chips 40. Specifically, the image acquiring unit 10 is horizontally moved by the known distance D to acquire images of the imaging target Q before and after the movement.

In FIG. 2, the imaging target (point) Q forms an image at a position A at the center of the imaging element 12 before the movement, and the imaging target (point) Q forms an image at a position B toward the right of the center of the imaging element 12 after the movement by the distance D. In this case, the distance between the position A and the position B is the distance X of the formed images corresponding to the distance D.

In this manner, it is possible to acquire the distance X of the formed images corresponding to the distance D and calculate the unknown distance Y between the image acquiring unit 10 and the imaging target (point) Q from Equation 2 above.

By repeating the step of acquiring the unknown distance Y while horizontally moving the image acquiring unit 10 in the direction in which the main spindle or the like is to be moved, the profile of the pile of chips 40 in the region where the main spindle or the like is to be moved can be obtained. In this manner, it is possible to perform distance measurement without taking idle time during the process from the preparation to the end of the machining of the machine tool. For example, in creating a measurement path before rough machining, it is possible to quickly recognize the profile of the pile of chips and set a movement route of the main spindle or the like. The accuracy of the acquired distance Y between the image acquiring unit 10 and the imaging target (point) Q is sufficient for the purpose of creating the measurement path before rough machining.

As described above, in the present embodiment, the movement mechanism 20 can relatively move the imaging target Q and the image acquiring unit 10 by the known distance D in a direction (horizontal direction in FIG. 1) substantially perpendicular to the imaging direction of the image acquiring unit 10 (vertical direction in FIG. 1), the image acquiring unit 10 can acquire images of the imaging target Q before and after the movement, and the control unit 30 can calculate the distance Y between the image acquiring unit 10 and the imaging target in the imaging direction based on the movement distance X measured in the two acquired images.

Although the image acquiring unit 10 is moved to obtain the unknown distance Y in the above description of the first distance measurement method, there is no limitation thereto, and the imaging target (point) Q may be moved to obtain the distance, or both of the image acquiring unit 10 and the imaging target (point) Q may be moved to obtain the distance.

[Second Distance Measurement Method]

Figure 3:
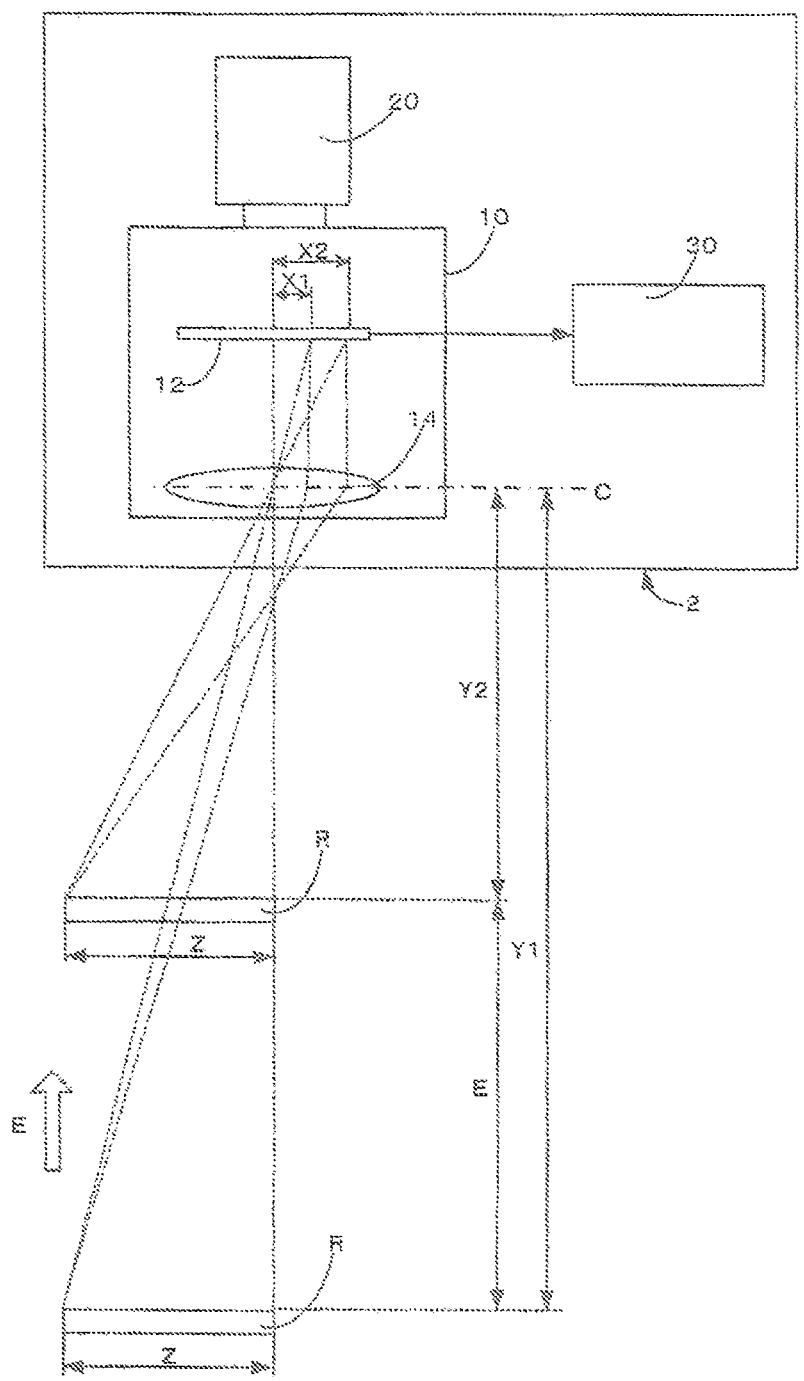
FIG. 3 is a diagram schematically showing a second distance measurement method in which distance measurement is performed by using the measurement device shown in FIG. 1.

Next, a second distance measurement method in which actual distance measurement is performed by using the above-described measurement device 2 will be described with reference to FIG. 3. FIG. 3 is a diagram schematically showing the second distance measurement method in which distance measurement is performed by using the measurement device shown in FIG. 1.

In the first distance measurement method described above, the image acquiring unit 10 and the imaging target Q are relatively moved by the known distance D in the horizontal direction to acquire images of the imaging target Q before and after the movement. However, in the second distance measurement method, the image acquiring unit 10 and an imaging target R are relatively moved by a known distance E in the vertical direction to acquire images of the imaging target R before and after the movement. The imaging target R has an unknown dimension Z (e.g., width dimension).

The second distance measurement method aims to obtain an unknown distance Y1 between the image acquiring unit 10 and the imaging target R. First, the image acquiring unit 10 acquires an image of the imaging target R separated by the unknown distance Y1. In this manner, a length X1 of the formed image of the imaging target R corresponding to the dimension Z is acquired.

Next, the image acquiring unit 10 and the imaging target R are relatively moved by the known distance E in the vertical direction. As shown here, the imaging target R is brought closer to the image acquiring unit 10 by the known distance E, and the distance between the image acquiring unit 10 and the imaging target R is an unknown distance Y2. The image acquiring unit 10 then acquires an image of the imaging target R separated by the unknown distance Y2. In this manner, a length X2 of the formed image of the imaging target R corresponding to the dimension Z is acquired.

Applying these to Equation 1 above, the following equation is obtained.

$$Y2/Y1=X1/X2 \quad \text{(Equation 3)}$$

Also, the following equation holds between the unknown distances Y1 and Y2 by using the known distance E.

$$Y1-E=Y2 \quad \text{(Equation 4)}$$

By substituting Equation 4 into Equation 3, the following equation holds.

$$Y1=(E \times X2)/(X2-X1) \quad \text{(Equation 5)}$$

As described above, the unknown distance Y1 can be calculated from the known vertical movement distance E and the lengths X1 and X2 acquired from the images.

As described above, in the present embodiment, the movement mechanism 20 can relatively move the imaging target Q and the image acquiring unit 10 by the known distance E in the imaging direction of the image acquiring unit 10 (vertical direction in FIG. 1), the image acquiring unit 10 can acquire images of the imaging target R before and after the movement, and the control unit 30 can calculate the distance Y1 between the image acquiring unit 10 and the imaging target in the imaging direction based on the lengths X1 and X2 measured in the two acquired images.

Although in the first distance measurement method described above, it is necessary to store in advance the distance L of the formed images corresponding to the known distance D and the known distance H as data, in the second distance measurement method, the distance can be obtained without using data stored in advance by relatively moving the imaging target Q and the image acquiring unit 10 by the detectable distance E.

Although the imaging target R is moved to obtain the distance in the above description of the second distance measurement method, there is no limitation thereto, and the image acquiring unit 10 may be moved to obtain the distance, or both of the image acquiring unit 10 and the imaging target R may be moved to obtain the distance.

As described above, the distance between the image acquiring unit 10 and the imaging target Q can be easily acquired with a simple configuration in the first or second distance measurement method described above. Thus, it is possible to provide the measurement device 2 capable of performing distance measurement in a short time without making contact with an object to be measured (imaging target).

(Resolution Improvement)

Further, the movement mechanism 20 can relatively move the imaging target and the image acquiring unit 10 by a distance smaller than a pixel of an image acquirable by the image acquiring unit 10, and the image acquiring unit 10 can acquire images of the imaging target before and after the movement. In this case, the resolution of the image acquiring unit 10 can be substantially improved by using an image obtained by movement by a distance smaller than a pixel acquired by the image acquiring unit 10 and interpolating it.

For example, an image having a substantially twofold resolution can be obtained by performing interpolation using an image acquired by relatively moving the imaging target and the image acquiring unit 10 by ½ pixel. In particular, by increasing the distance between the imaging target and the image acquiring unit 10, the distance on the imaging element 12 of the image acquiring unit 10 can be reduced relative to the actual relative movement distance. Therefore, it becomes easy to acquire an image obtained by movement by a distance smaller than a pixel of an image acquirable by the image acquiring unit 10.

Other Embodiments

Although the measurement device 2 according to the above-described embodiments has been described using an example where it is applied to a machine tool, there is no limitation thereto, and it is applicable to any other field that requires non-contact and quick distance measurement.

Although the embodiments and modes of the present invention have been described, the configurational details of the disclosure may change, and changes in combinations and orders of elements in the embodiments and modes and the like can be realized without departing from the scope and spirit of the claimed invention.

REFERENCE SIGNS LIST 2 measurement device
10 image acquiring unit
12 imaging element
14 optical system
20 movement mechanism
30 control unit
40 chips
A, B, C position
P, Q imaging target (point)
R imaging target

The invention claimed is:

1. A distance measuring device machine tool comprising:
an actuator that moves a mounting portion of a tool or a workpiece;
an image sensor for acquiring an image of an imaging target, said image sensor attached to the mounting portion of a machine tool, the mounting portion moved by the actuator; and
a processor that controls the image sensor and the actuator, wherein:
the image sensor, acquires images of the imaging target having a unknown dimension Z while the image sensor and the imaging target are separated by a unknown distance Y1 in an imaging direction of the image sensor, the processor acquires a length X1 of the imaging target corresponding to the unknown dimension Z at the unknown distance Y1,
the actuator moves the imaging target and the image sensor relatively by the known distance E in the imaging direction, and
the image sensor acquires images of the imaging target having the unknown dimension Z while the image sensor and the imaging target are separated by a unknown distance Y2 in the imaging direction, the processor acquires a length X2 of the imaging target corresponding to the unknown dimension Z at the unknown distance Y2, and calculates the unknown distance Y1 by the following formula:

$Y1=(E \times X2)/(X2-X1)$.

* * * * *